US010190916B1

(12) United States Patent
Adams

(10) Patent No.: US 10,190,916 B1
(45) Date of Patent: Jan. 29, 2019

(54) SYSTEM FOR TRUE THERMAL-LIGHT APPLICATIONS

(71) Applicant: Energy, United States Department of, Washington, DC (US)

(72) Inventor: Bernhard W. Adams, Naperville, IL (US)

(73) Assignee: U.S. Department of Energy, Washington, DC (US)

( * ) Notice: Subject to any disclaimer, the term of this patent is extended or adjusted under 35 U.S.C. 154(b) by 112 days.

(21) Appl. No.: 15/418,047

(22) Filed: Jan. 27, 2017

Related U.S. Application Data

(60) Provisional application No. 62/288,558, filed on Jan. 29, 2016.

(51) Int. Cl.
  *G01J 5/08* (2006.01)
  *G01J 5/10* (2006.01)
  *G01J 5/00* (2006.01)

(52) U.S. Cl.
  CPC .......... *G01J 5/0896* (2013.01); *G01J 5/0862* (2013.01); *G01J 5/10* (2013.01); *G01J 2005/0077* (2013.01); *G01J 2005/106* (2013.01)

(58) Field of Classification Search
  CPC .......... G01J 5/0896; G01J 5/0846; G01J 5/06; G01J 2005/067; G01J 5/08; G01J 5/0803; G01J 5/0862; G01J 5/10; G01J 2005/106; G01J 2005/0077
  See application file for complete search history.

(56) References Cited

U.S. PATENT DOCUMENTS

| 8,269,978 | B2 * | 9/2012 | Capron | G01S 17/89 356/484 |
| 8,604,440 | B2 * | 12/2013 | Frisch | G01T 1/208 250/367 |
| 8,969,823 | B2 * | 3/2015 | Elam | H01J 43/246 250/390.01 |
| 9,557,262 | B2 * | 1/2017 | Zeilinger | G01N 21/64 |
| 2009/0072146 | A1 * | 3/2009 | Youngner | G01S 13/887 250/339.06 |
| 2009/0194702 | A1 * | 8/2009 | Meyers | H04L 9/0858 250/393 |
| 2009/0310118 | A1 * | 12/2009 | Halldorsson | G01P 5/26 356/28 |
| 2010/0123091 | A1 * | 5/2010 | Gilbert | G01S 7/484 250/493.1 |

(Continued)

*Primary Examiner* — John Lee
(74) *Attorney, Agent, or Firm* — Karen L. Blouin; Michael J. Dobbs; Brian J. Lally

(57) ABSTRACT

A system for type-2 ghost imaging of an object located in or obstructed by a turbulent air section includes a thermal light source, a beamsplitter configured to split light from the thermal light source into two optical paths of substantially equal length, a surface divided into two regions of equal area, a first region including the object and a second region that does not include the object, a narrowband spectral filter, and at least one detector having a predetermined spatial resolution and a predetermined temporal resolution. The object is located on one side of the turbulent air section and the at least one detector is located on another side of the turbulent air section. The at least one detector may be a large area picosecond photo-detector (LAPPD) having a spatial resolution of the order of millimeters and a temporal resolution of the order of 10 to 100 picoseconds.

17 Claims, 10 Drawing Sheets

(56) References Cited

U.S. PATENT DOCUMENTS

| | | | | |
|---|---|---|---|---|
| 2010/0140458 A1* | 6/2010 | Meyers | ............... | B82Y 10/00 250/214 R |
| 2010/0252745 A1* | 10/2010 | Hunt | ............... | G01S 7/4861 250/372 |
| 2010/0258708 A1* | 10/2010 | Meyers | ............... | G01S 17/36 250/208.1 |
| 2010/0294916 A1* | 11/2010 | Meyers | ............... | B82Y 10/00 250/208.1 |
| 2011/0254968 A1* | 10/2011 | Imai | ............... | H04N 5/30 348/216.1 |
| 2011/0284724 A1* | 11/2011 | Meyers | ............... | B82Y 10/00 250/208.1 |
| 2012/0161010 A1* | 6/2012 | Azzazy | ............... | H01J 29/89 250/353 |
| 2012/0162631 A1* | 6/2012 | Hutchin | ............... | G01S 7/4815 356/4.07 |
| 2012/0229668 A1* | 9/2012 | Meyers | ............... | G06T 3/4053 348/222.1 |
| 2012/0327287 A1* | 12/2012 | Meyers | ............... | G01B 11/24 348/335 |
| 2013/0077888 A1* | 3/2013 | Meyers | ............... | G06T 5/50 382/274 |
| 2014/0029850 A1* | 1/2014 | Meyers | ............... | G06T 5/50 382/167 |
| 2014/0340570 A1* | 11/2014 | Meyers | ............... | H04N 5/211 348/370 |
| 2014/0353475 A1* | 12/2014 | Meyers | ............... | G06N 99/002 250/216 |
| 2014/0368715 A1* | 12/2014 | Shih | ............... | G01N 21/41 348/311 |
| 2015/0077734 A1* | 3/2015 | Habif | ............... | G01S 17/107 356/5.03 |
| 2015/0237722 A1* | 8/2015 | Hwu | ............... | H01P 3/082 174/255 |
| 2017/0134680 A1* | 5/2017 | Zhong | ............... | G01B 11/25 |

\* cited by examiner

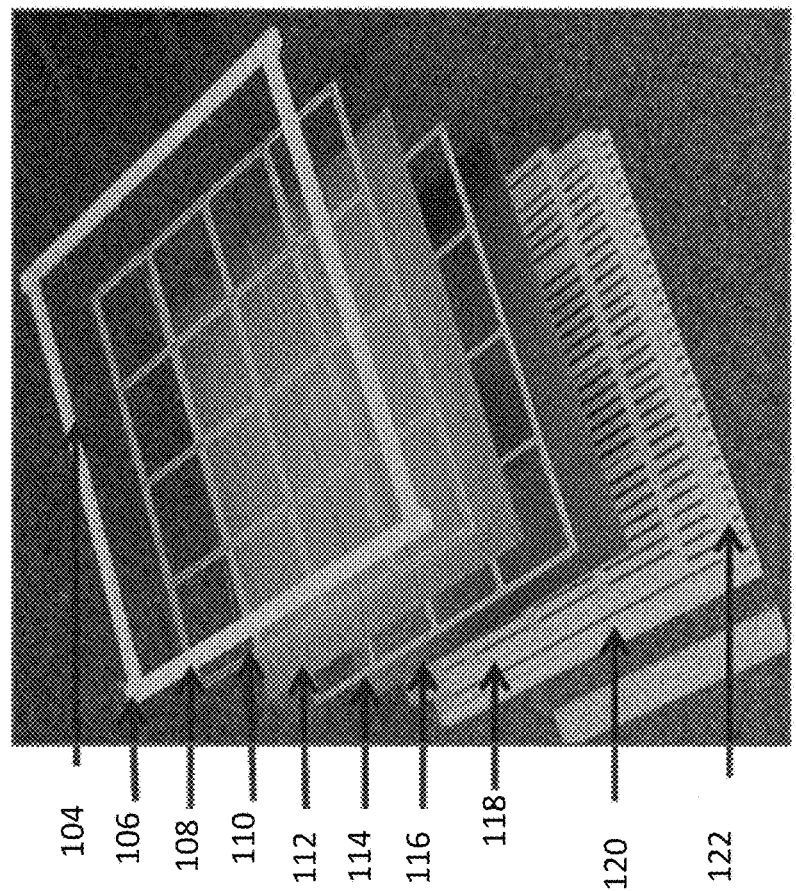
104 106 108 110 112 114 116 118 120 122
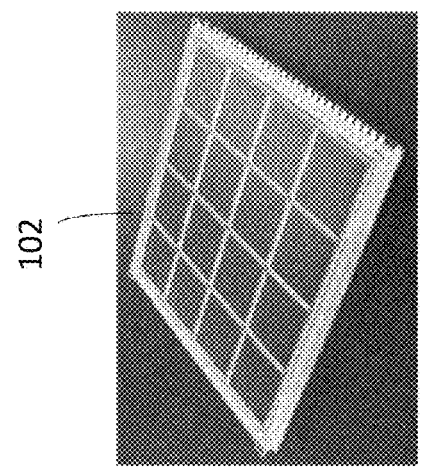
102
Figure 1

SYSTEM FOR TRUE THERMAL-LIGHT APPLICATIONS

CROSS-REFERENCE TO RELATED APPLICATIONS

This application claims the benefit of U.S. provisional patent application 62/288,558, filed Jan. 29, 2016.

STATEMENT OF GOVERNMENT INTEREST

The United States Government claims certain rights in this invention pursuant to Contract No. DE-AC02-06CH11357 between the U.S. Department of Energy and UChicago Argonne, LLC, as operator of Argonne National Laboratories.

FIELD OF THE INVENTION

The present invention relates generally to the field of imaging with visible light that has thermal photon statistics (i.e., visible light such as sunlight, light bulb, etc., but excluding a laser). More specifically, the present invention relates to using a detector having a predetermined spatial resolution and temporal resolution for true thermal-light imaging.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Ghost imaging is the term that has become popular for imaging with photon correlations instead of accumulating single-photon events. There are two types of ghost imaging-type 1 is based on entangled photons, and type 2 on intensity correlations in thermal light of the type first used in the famous Hanbury Brown-Twiss (HBT) experiment. The thermal-light ghost imaging (TGI) is the focus of this application. In this context, the term "thermal" does not refer to infrared wavelengths, but rather the photon statistics of the light emitted from a glowing-hot surface as opposed to, for example, laser light. TGI is capable of forming an image where conventional imaging based on single photons is not, due to fluctuating distortions in the optics, for example, from a turbulent atmosphere. As will be described below, TGI relies on a combination of narrow spectral bandwidth and a high temporal resolution of imaging detectors. The faster the detector, the more spectral bandwidth is admissible. TGI offers some advantages over conventional imaging, such as being minimally affected by turbulent atmospheric conditions, but requiring more sophisticated instrumentation.

The original Hanbury Brown-Twiss experiment measured the angular diameter of a star (Sirius A), which, at about 6 milli-arcseconds, was below the resolution limit of telescopes in the 1950s. It did so by determining intensity correlations from the same source seen from two telescopes as a function of their spatial separation. The correlation drop-off over the separation is reciprocal to the angular range of light coming from different parts of the stellar disk. The intensities are correlated only over times that are reciprocal to the spectral bandwidth of the light, as set by filters on the telescopes. A narrow spectral bandwidth gives rise to longer coherence times (lengths of the wavepackets), and correspondingly slower detectors can detect correlations. Even if the temporal resolution of the detectors does not match the reciprocal spectral bandwidth, correlations are present, but at a reduced contrast, such as in the original HBT experiment. The remarkable fact about this experiment is that the signal contrast is not affected by atmospheric "seeing", i.e., the image distortions from variable refractive-index gradients in the turbulent atmosphere. These affect both photons in the same way, and thus cancel out. If the detectors have a temporal resolution that is insufficient, then the interference contrast will be reduced as there are many chance coincidences on top of the meaningful ones. One can then reduce the bandwidth of the light by choosing narrower filters, use a light source that emits very narrowband light (not an option in astronomy), or use a faster detector.

Type-2 ghost imaging is conceptually rather similar. In a typical configuration (see FIG. 4), a fast "bucket detector" with no spatial resolution is used to gate acquisition with an imaging detector. Each time the bucket detector registers a photon, the location of the corresponding photon on the imaging detector is determined. This splitting of functions was necessary because no fast imaging detector was available. Furthermore, all demonstration experiments of thermal-light ghost imaging used some kind of very narrowband light source, such as a laser with means to make the spatial mode appear like thermal light, a so-called pseudo-thermal light source, or a hollow-cathode lamp. The only demonstration of GI with spectrally filtered sunlight was done with a pair of point detectors, i.e., detectors lacking spatial resolution.

A need exists for improved technology, including technology that can perform imaging at temporal resolutions approaching the reciprocal bandwidth of commercially available interference filters.

SUMMARY

One embodiment of the invention includes a system for type-2 ghost imaging of an object located in a turbulent air section or obstructed by a turbulent air section. The system includes a thermal light source, a beamsplitter configured to split light from the thermal light source into two optical paths of equal length, a surface divided into two regions of equal area, a first region including the object and a second region that does not include the object, a narrowband spectral filter, and at least one detector having a predetermined spatial resolution and a predetermined temporal resolution. The object is located on one side of the turbulent air section and the at least one detector is located on another side of the turbulent air section. The at least one detector may be, for example, a large area picosecond photo-detector (LAPPD) having a spatial resolution of the order of millimeters (or better) and a temporal resolution of the order of 10 to 100 picoseconds.

Another embodiment of the invention includes a system for type-2 ghost imaging of an object located in a turbulent air section or obstructed by a turbulent air section. The system includes a thermal light source, a beamsplitter configured to split light from the thermal light source into two optical paths of equal length, a surface divided into two regions of equal area, a first region including the object and a second region that does not include the object, a narrowband spectral filter, and a single detector having a predetermined spatial resolution and a predetermined temporal resolution. The object is located on one side of the turbulent air section and the single detector is located on another side of the turbulent air section. A first half of the single detector is configured to function as a bucket detector that collects and counts photons scattered and reflected from the object in the first region, and a second half of the single detector is configured to function as an imaging detector that captures reference spatial information of reflected light from the second region. The single detector may be, for example, a large area picosecond photo-detector (LAPPD) having a spatial resolution of the order of millimeters (or better) and a temporal resolution of the order of 10 to 100 picoseconds.

Yet another embodiment of the invention includes a system for type-2 ghost imaging of an object located in a turbulent air section or obstructed by a turbulent air section. The system includes a thermal light source, a beamsplitter configured to split light from the thermal light source into two optical paths of equal length, a surface divided into two regions of equal area, a first region including the object and a second region that does not include the object, a narrow-band spectral filter, and two detectors, each having a predetermined spatial resolution and a predetermined temporal resolution. The object is located on one side of the turbulent air section and the two detectors are located on another side of the turbulent air section. The first detector is configured to function as a bucket detector that collects and counts photons scattered and reflected from the object in the first region. The second detector is configured to function as an imaging detector that captures reference spatial information of reflected light from the second region. At least one of the first detector and the second detector comprises a large area picosecond photo-detector (LAPPD) having a spatial resolution of the order of millimeters (or better) and a temporal resolution of the order of 10 to 100 picoseconds.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which:

FIG. 1 illustrates an embodiment of a large area picosecond photo-detector (LAPPD).

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Thermal Ghost Imaging

Ghost imaging or the Hanbury Brown-Twiss experiment works by spatially correlating photons that are related to each other by longitudinal coherence, for example, in a biphoton quantum state. Biphoton quantum states are quantum states that manifest themselves through a two-photon-correlated detection such that it is, in principle, impossible to distinguish between the photons as to which one can be attributed to which source, or which way the electromagnetic field connected the emission and detection events. Ideally, this requires a spectral bandwidth that is reciprocal to the time response of the detectors at the Fourier-transform limit. When slower detectors or a wider bandwidth are used, then the correlation contrast goes down correspondingly.

Figure 3:
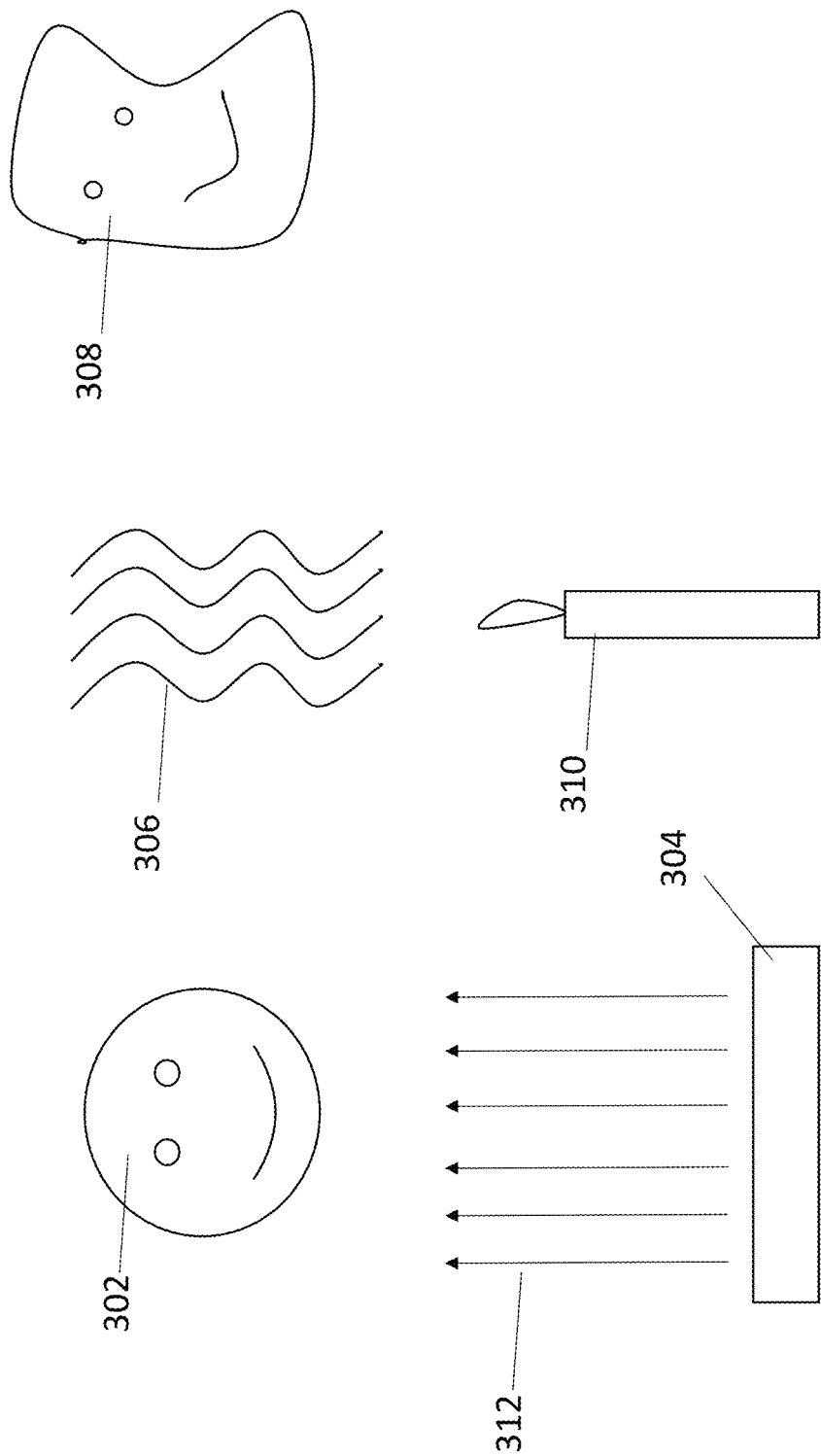
FIG. 3 illustrates a problem in which an image viewed through turbulent air becomes distorted.

As seen in FIG. 3, when an object 302 is illuminated by a thermal light source 304 (e.g., a light bulb), and then viewed through turbulent air 306 (e.g., the air above a candle flame 310), the image of the object 308 fluctuates and is distorted.

In the experiments that demonstrate ghost imaging through a section of turbulent air that obliterates a conventional image (e.g., the situation illustrated in FIG. 3), a laser is used for the narrow spectral bandwidth, and its spatial coherence properties are "thermalized" by sending the beam through a section of spinning ground glass. To date, all demonstration experiments of conventional type-2 ghost imaging used a pseudothermal light source emitting light at a very narrow bandwidth. For example, prior experiments used a laser with means to make the spatial mode appear like thermal light, a so-called pseudo-thermal light source, or a hollow-cathode lamp. The only demonstration of type-2 ghost imaging with spectrally filtered sunlight was done with a pair of fast point detectors, i.e., detectors lacking spatial resolution.

Figure 4:
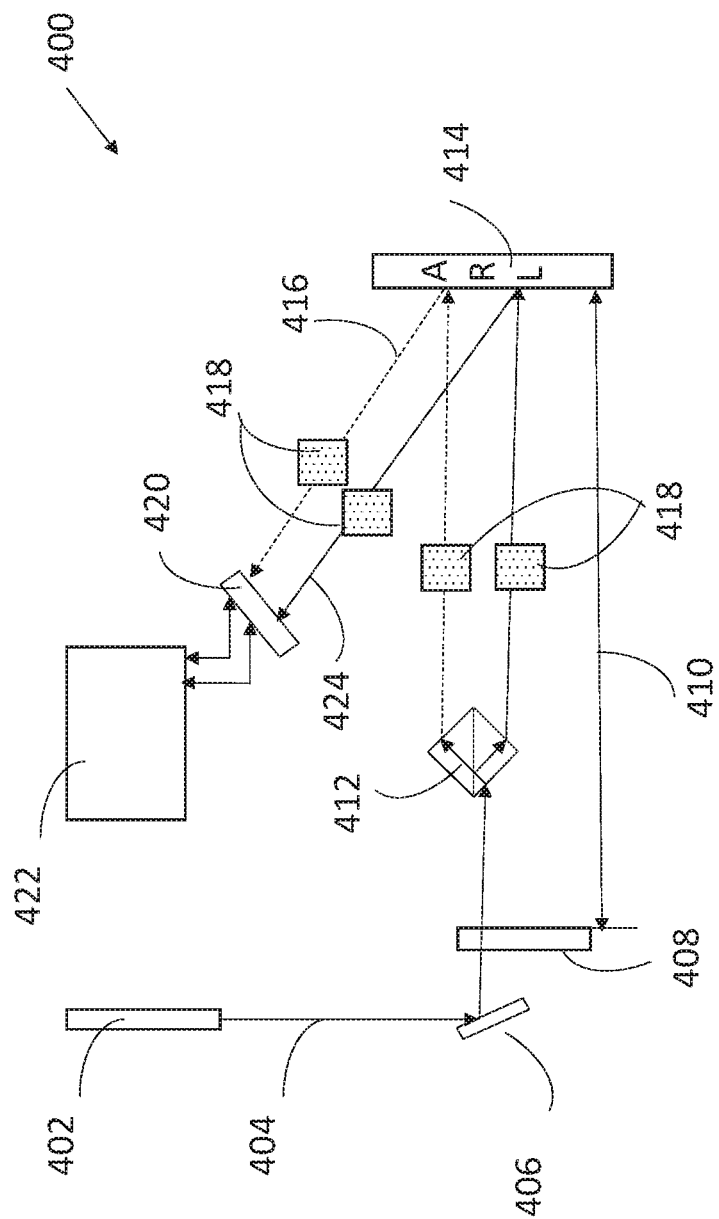
FIG. 4 illustrates a conventional system for performing type-2 ghost imaging with a CCD, where the right half of the CCD functions as a bucket detector and the left half of the CCD functions as an imaging sensor.

Referring to FIG. 4, one example of conventional type-2 ghost imaging involves using a fast "bucket detector" 420 with no spatial resolution to gate acquisition with an imaging detector. The experiment was conducted by Meyers et al., and is described in "Turbulence-free ghost imaging," Applied Physics Letters, 98, 111115 (2011), the entire contents of which has been incorporated by reference in its entirety. As seen in FIG. 4, turbulence is introduced by adding heating elements 418 at 550° C. underneath any or all optical paths 416, 424. Heating of the air causes temporal and spatial fluctuations on its index of refraction that makes the classical image of the object jitter about randomly on the image plane causing a "blurred" picture. The light source is a typical chaotic pseudo-thermal source, which contains a laser beam 404 and a fast rotating ground glass diffuser 408. The chaotically scattered laser beam 404, with a fairly large size (11 mm diameter) in transverse dimension, is split into two by a 50%-50% beamsplitter (BS) 412. One of the beams 416, 424 illuminates an object located at z1, such as the letters "ARL" shown in FIG. 4. In FIG. 4, dashed arrows indicate the optical path to the "bucket detector" 416 and solid arrows indicate the optical path of the reference image 424. The photons scattered and reflected from the object are collected and counted by a "bucket" detector 420, which is simulated by the right-half of the charged coupled device (CCD) 420. The other beam 424 propagates to the ghost image plane of z2=z1≈1.4 m and the path from the target to the detectors over heating elements is ≈1.7 m. Placing a CCD array 420 on the ghost image plane, allows it to capture the ghost image of the object if its exposure is gated by the bucket detector 420. In the example of FIG. 4, the CCD array 420 images the target 414 and reference planes located on a sheet of paper where one half is glossy white and the other half contains the target (i.e., the letters "ARL"). The scattered and reflected light from the glossy white half of the paper, which contains the reference spatial information for the ghost image, is then captured by the left-half of the high resolution CCD camera 420 operating in the photon counting regime. The CCD camera 420 is focused onto the ghost image plane and is gated by the bucket detector for the generation of the secondary ghost image.

Referring to FIG. 4, "gated" means that the CCD 420 is read out periodically, and whenever a photon is seen in the region designated the "bucket detector," the readout of the other half (i.e., the region designated the "imaging detector") is used for data analysis. In other contexts, such as where point detectors are used, "gated" means that the signal (i.e., photon or no photon) from the "imaging detector" is recorded whenever the "bucket detector" gives off a signal.

In the example of FIG. 4, the CCD 420 must be single-photon sensitive. Therefore, the CCD 420 may be, for example, an iCCD (a CCD with an image intensifier) or an emCCD (a CCD with built-in gain). Each half of the CCD camera 420 can play the role of an independent classical camera in its "normal" ungated operation. The hardware circuit and the software program 422 monitor the outputs of the left-half and the right-half of the CCD 420 individually, as two independent classical cameras, and simultaneously to monitor the gated output of the left-half of the CCD 420 as a ghost camera. The classical image and the secondary ghost image of the object 414 are captured and monitored simultaneously when turbulence is introduced to any or to all of the optical paths 416, 424. The right-half of the CCD 420 acts as a "bucket detector" and has no spatial resolution (i.e., no imaging capability) because the spatial information is removed by adding up signals from all pixels in the image. Each time the bucket detector 420 registers a photon, the location of the corresponding photon on the imaging detector is determined. This splitting of functions is necessary in conventional type-2 ghost imaging because no fast imaging detector was available. Although a CCD/CMOS camera offers many pixels with respect to spatial resolution, the CCD/CMOS camera has a vastly inferior temporal resolution when compared to other commercially available detectors. The temporal resolution of a typical CCD/CMOS camera is, at best, about 0.1 ms.

Figure 5:
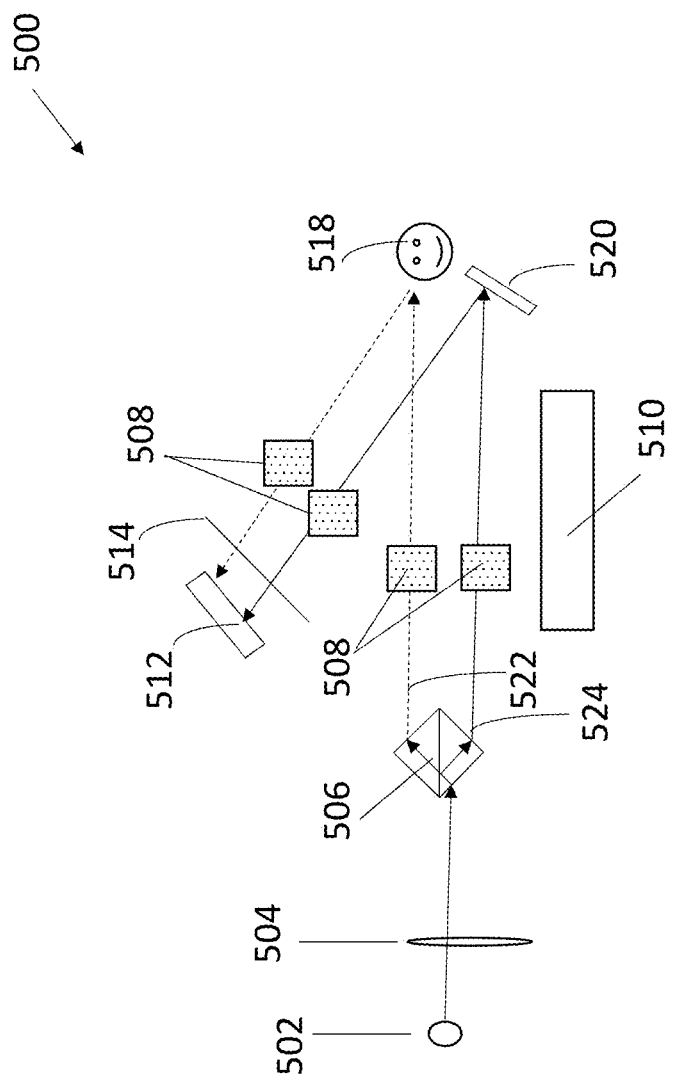
FIG. 5 illustrates an embodiment of the system of the present application in which the CCD of FIG. 4 is replaced with an imaging detector having a predetermined spatial resolution and a temporal resolution in the picosecond range. The left half of the imaging detector functions as the bucket detector and the right half of the imaging detector functions as an imaging sensor.
Figure 6:
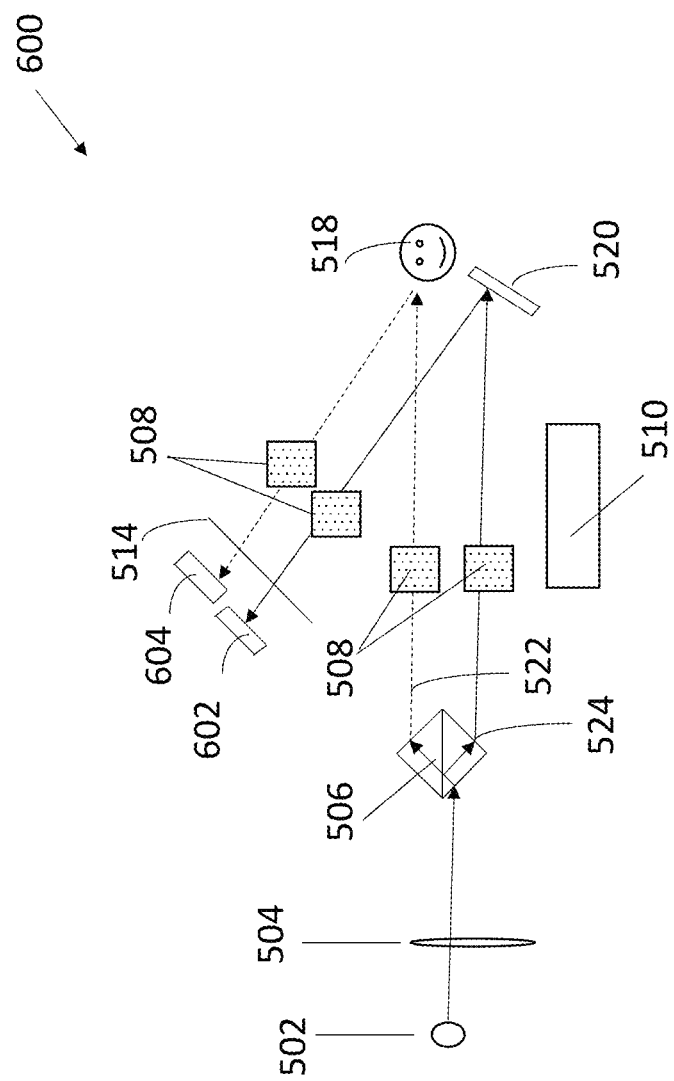
FIG. 6 illustrates an embodiment of the system of the present application in which the CCD of FIG. 4 is replaced with one bucket detector and one imaging detector having a predetermined spatial resolution and a predetermined temporal resolution.

Referring now to FIGS. 5-6, type-2 ghost imaging is performed by replacing the pseudo-thermal light source 410 of FIG. 4 with a true thermal light source 502, eliminating the fast rotating ground glass diffuser 404, and replacing the CCD with at least one detector having a predetermined spatial resolution and temporal resolution 512, 602, 604. The rotating ground glass diffuser 404, which was used in the experiment of FIG. 4 to slow the temporal fluctuations to introduce relatively slow fluctuations of the laser light 410 (i.e., a chaotic light source), may be eliminated due to the temporal resolution of the detector(s) 512, 602, 604 used in the embodiments of FIGS. 5 and 6. The predetermined spatial resolution may be of the order of millimeters and the predetermined temporal resolution may be of the order of picoseconds The true thermal light source 502 must be point-like in that its size times the angular divergence admitted into a collimating lens 504 must be of the order of the wavelength, or smaller. Otherwise, with multiple transverse modes in the optical system, the contrast goes down. In this context, the term "thermal" does not refer to infrared wavelengths, but rather the photon statistics of the light emitted from a glowing-hot surface as opposed to, for example, laser light. Examples of true thermal light sources 502 include visible light such as sunlight, light bulb, etc. (but excluding a laser) and light from a star.

The predetermined spatial and temporal resolutions are selected such that the detector 512, 602, 604 can resolve electromagnetic field modes to determine the photon occupation in each of them: transversely with optics that are diffraction-matched to the pixel size, and longitudinally with a temporal resolution matched to the coherence time of available spectral filters. Using at least one detector 512, 602, 604 having the predetermined spatial resolution and temporal resolution allows the type-2 ghost imaging to be performed with true thermal light 502, as opposed to a pseudo-thermal light source 410. The predetermined spatial resolution may be, for example, 16×16 pixels, 32×32 pixels, 100×100 pixels, 400×400 pixels, or 100×1 pixels. One of ordinary skill in the art would understand that as the spatial resolution increases, the quality of the ghost image increases. For example, a detector having a 32×32 spatial resolution may produce a coarse image, while a detector having a 400×400 spatial resolution may produce an image having the quality typically seen on a computer monitor or television. The predetermined temporal resolution may be, for example, in the picosecond range, such as 1-200 picoseconds, 100-200 picoseconds, 10-100 picoseconds, 1-100 picoseconds, 1-50 picoseconds, 50-200 picoseconds or 50-100 picoseconds. In one embodiment, the spatial resolution may be 50 microns and the temporal resolution may be 10 picoseconds.

In some embodiments (e.g., FIG. 5), a single detector is selected 512, and like the embodiment of FIG. 4, half of the detector 512 functions as the bucket detector, while the other half of the detector 512 functions as the imaging detector. In other embodiments (e.g., FIG. 6), a first detector 604 is selected as the bucket detector and a second detector 602 is selected as the imaging detector. The first detector and the second detector 602, 604 may be the same type of detector or different types of detectors. The first detector 604 functions as the bucket detector and the second detector 602 functions as the imaging detector.

The detector of FIG. 5 512 and one or both of the detectors of FIG. 6 602, 604 may be a microchannel plate (MCP)-based detector or a non-MCP-based detector. Microchannel plates (MCPs) are two dimensional arrays of microscopic channel electron multipliers. An MCP detector is a type of spatially resolving electron amplifier. The MCP detector can, for example, be used as a component in a detector system to detect low levels of electrons, ions, photons, or neutrons, and provide an amplified response via a plurality of secondary electron emissions that occur within the channels of the microchannel plates thereof. Commercially available MCP detectors are capable of micron-scale spatial resolutions, sub-nanosecond temporal resolutions, and gains exceeding $10^7$. The performance of MCP-based photodetectors depends not only on the microchannel plates themselves, but also on their configuration (e.g. single, double; chevron-type or triple; z-stack), as well as on the photocathode, the anode structure, and the signal readout.

The detector of FIG. 5 512 and one or both of the detectors of FIG. 6 602, 604 may be, for example, a large area picosecond photo-detector (LAPPD) having a 2d spatial resolution of the order of millimeters and a temporal resolution of the order of 10 to 100 ps, a Planacon MCP detector having a 2d spatial resolution of 32×32 pixels and a temporal resolution of about 50 ps, a single-photon avalanche diode (SPAD) (photodiode array) having a 2d spatial resolution of 32×32 pixels and a temporal resolution of about 50 ps, or a pixeleted photomultiplier tube (e.g., a Hamamatsu Photonics photomultiplier tube) having a 2d spatial resolution of 16×16 pixels and a temporal resolution of about 100-200 ps. In some embodiments it may be possible to use a detector such as a streak camera that only has a 1d spatial resolution (e.g., 100×1 pixels) and a temporal resolution of about 1 ps. In the examples described above, the large area picosecond photo-detector is the best choice in terms of a combined spatial resolution and temporal resolution, however, the streak camera is faster at the expense of not being an imaging detector. Unlike the conventional bucket detector, the LAPPD combines imaging capabilities with a high temporal resolution. For example, in one embodiment, the LAPPD has a temporal resolution of the order of 50 ps, which corresponds to a relative spectral bandwidth of about $\Delta\lambda/\lambda, =10^{-5}$ at a wavelength of 500 nm (green light).

Referring to the embodiment illustrated in FIG. 5, type-2 ghost imaging is performed using a thermal light source 502, a collimating lens 504, a beamsplitter 506, at least one heating element 510, and a single imaging detector 512. The collimated thermal light source is split into two by a 50%-50% beamsplitter 506. One of the beams 522 illuminates an object 518 (i.e., a smiley face) located immediately adjacent to a mirror or other light scattering surface 520 in a same plane, while the other beam 524 illuminates the mirror or other light scattering surface 520. Alternatively, the object 518 may cover half of the mirror 520, with one of the beams 522, 524 illuminating the half of the mirror 520 covered by the object 518 and the other beam 522, 524 illuminating the other half of the mirror 520. The scattered and reflected light from the mirror 520 or uncovered half of the mirror 520, which contains the reference spatial information for the ghost image, is then captured by the left-half of the single detector 512 operating in the photon counting regime. The left half of the single detector 512 is focused onto the ghost image plane and is gated by or correlated with the right half of the single detector 512 (i.e., the bucket detector) for the generation of the secondary ghost image.

The single detector 512 must be single-photon sensitive for true thermal-light ghost imaging. In one embodiment, the single detector 512 is a LAPPD detector. Each half of the LAPPD 512 can play the role of an independent classical camera in its "normal" ungated operation. The hardware circuit and the software program monitor the outputs of the left-half and the right-half of the LAPPD 512 individually, as two independent classical cameras, and simultaneously to monitor the gated output of the left-half of the LAPPD 512 as a ghost camera. The classical image and the secondary ghost image of the object are captured and monitored simultaneously when turbulence is introduced to any or to all of the optical paths. The right-half of the LAPPD 512 acts as a "bucket detector." Each time the bucket detector registers a photon, the location of the corresponding photon on the imaging detector is determined. Although the spatial and temporal resolutions of the LAPPD 512 do not require this splitting, this embodiment may be more cost effective than providing two LAPPDs. The LAPPD 512 (the structure of which will be described in detail below) is a photon detector with a 2d spatial resolution of the order of millimeters (e.g., 400×400 pixels) and a temporal resolution of the order of 10 to 100 ps.

The embodiment of FIG. 6 includes the same components and set-up as the embodiment of FIG. 5, with the exception that two detectors 602, 604 are used instead of the single detector 512 of FIG. 5. Both the first detector and the second detector 602, 604 have a temporal resolution in the picosecond range. For example, the first detector 604 may be a picosecond-resolving bucket detector and the second detector 602 may be a picosecond-resolving imaging detector. In another example, both the first detector and the second detector 602, 604 are picosecond-resolving imaging detectors. In other words, the picosecond-resolving bucket detector 604 may be replaced by a second picosecond-resolving imaging detector 602 by integrating over the spatial coordinates, provided that the second picosecond-resolving imaging detector has the required time resolution matching the first picosecond-resolving imaging detector. The bucket detector 604 may be a similarly fast, but not necessarily spatially resolving detector. However, the bucket detector 604 needs to have a sensitive area similar in size to that of the imaging detector 602. One of ordinary skill in the art would understand that a CCD cannot be used because a CCD is too slow (i.e., is not picosecond-resolving).

In one example, an LAPPD is used as the imaging detector 602 and another picosecond-resolving detector such as an avalanche photodiode or a photomultiplier tube (or any other picosecond-resolving detector) is used as the bucket detector 604.

In another example, an LAPPD is used as the bucket detector 604 and another picosecond-resolving detector such as an avalanche photodiode or a photomultiplier tube (or any other picosecond-resolving detector) is used as the imaging detector 602.

In yet another example, both the bucket detector 604 (i.e., the first detector) and the imaging detector 602 (i.e., the second detector) may be LAPPD detectors. Because the first detector and the second detector 602, 604 are the same type of detector, the first detector and the second detector 602, 604 have a sensitive area that is the same size. Therefore, it is possible to sum up over all pixels. It is possible that utilizing two detectors 602, 604 each having the predetermined spatial and temporal resolutions may yield additional information, as compared to the information yielded when only one of the detectors has both the predetermined spatial and temporal resolutions or each detector has one of the predetermined spatial resolution or the predetermined temporal resolution.

The examples of FIGS. 5 and 6 illustrate a planar object 518 in the same plane as the mirror or other light scattering surface 520. If the detector(s) 512, 602, 604 are gated (i.e., select events during a pre-set time window), a planar object 518 in the same plane as the mirror or other light scattering surface 520 is preferable. However, if the detector(s) 512, 602, 604 do not have to be gated, the object 518 is not limited to being a planar object, and the planar or non-object may be in a different plane than the mirror or other light scattering surface 520. The LAPPD is an example of a detector 512, 602, 604 that does not have to be gated. If the detector(s) 512, 602, 604 do not have to be gated, a time delay can be introduced in the correlation done offline, for example, by a computer. Therefore, such detectors 512, 602, 604 are not limited to a plane.

Commercially available interference filters 514 may also be used when performing type-2 ghost imaging. In the embodiments of FIGS. 5 and 6, a narrowband spectral filter 514 is placed in front of the detector(s) 512, 602, 604. The narrowband spectral filter 514 restricts the number of longitudinal modes, allowing the detector 512, 602, 604 having the predetermined temporal resolution to resolve them. The combination of temporal and spectral resolution is expressed as the time-bandwidth product. The time-bandwidth product should be as low as possible for a good correlation contrast. Ideally, the time-bandwidth product should be 1. If the time-bandwidth product is larger than 1, there will still be a signal, but with reduced contrast (same as with multiple uncorrelated, and unresolved transverse modes in the optical system). The embodiment of FIG. 4 does not include a narrowband spectral filter 514 due to the narrow bandwidth of the laser 410, which needs to be much narrower than the bandwidth of the thermal light source 502 of FIGS. 5 and 6 due to the slow detectors 418 used in the embodiment of FIG. 4.

Commercially available interference filters 514 can reach a relative bandwidth of about $10^{-3}$. In FIG. 6, for example, the two detectors 602, 604 (e.g., two LAPPD detectors) see the same (filtered) part of the spectrum of light, and signals are correlated at equivalent times (optical path plus electronic delay). This is accomplished, for example, by placing interference filters 514 into the optical paths in front of the detectors 602, 604. The filters 514 must have the same spectral transmission band. The two detectors 602, 604 do not need to be placed at the same distance from the source, or the object 518, but the sum of optical path and electronic delay is relevant. One of ordinary skill in the art would understand how to compensate for differences in the placements of detectors by changing the electronic delay in the signal correlation.

Using the LAPPD in combination with commercially available interference filters 514, results in a time-bandwidth product of $10^{-3}/10^{-5}$. Thus, it is possible to achieve ghost imaging at a 1% signal contrast using true thermal light (sunlight) and interference filters costing a few 100 dollars. Commercially available interference filters include ultra-narrowband interference filters, etalon filters and Faraday anomalous dispersion filters. For example, one ultra-narrowband interference filter produced by Alluxa has a transmission width of 0.36 nm at a wavelength of 532 nm. Omega sells ultra-narrowband interference filters of similar widths, for example, a filter with a 0.25 nm bandwidth at longer wavelengths around 1500 nm. Etalon filters can go narrower, but are complex opto-mechanical devices. Faraday anomalous dispersion filters are even narrower and even more complex (gas cells, magnetic fields, etc.).

In FIGS. 5 and 6, the beamsplitter 506 is shown schematically. The beamsplitter 506 is not necessarily a cube beamsplitter, as such a device would not result in the 45-degree turns as shown unless the beam has an infinite refractive index. The beamsplitter 506 is schematically illustrated to emphasize that the two optical paths 522, 524 must be of roughly equal length within the coherence length of the light given by the spectral bandwidth.

The ghost images produced by the systems described in FIGS. 5 and 6 are "turbulence-free" in that any index of refraction fluctuation of turbulence in the optical path will not affect the quality of the ghost image.

The detector(s) of FIGS. 5 and 6 may be connected to a processor and/or other electronics configured to monitor the outputs of the left-half and the right-half of the single detector 512 (see FIG. 5) or the first detector and the second detector 602, 604 (see FIG. 6) individually, separately and/or simultaneously. The processor may include as one or more computer programs, i.e., one or more modules of computer program instructions, encoded on one or more computer storage medium for execution by, or to control the operation of, data processing apparatus configured to convert the signal(s) output from the detectors into a ghost image.

The structure of the LAPPD used in the embodiments of FIGS. 5-6 will be discussed in further detail below.

Large Area Picosecond Photo-Detector (LAPPD)

Figure 2:
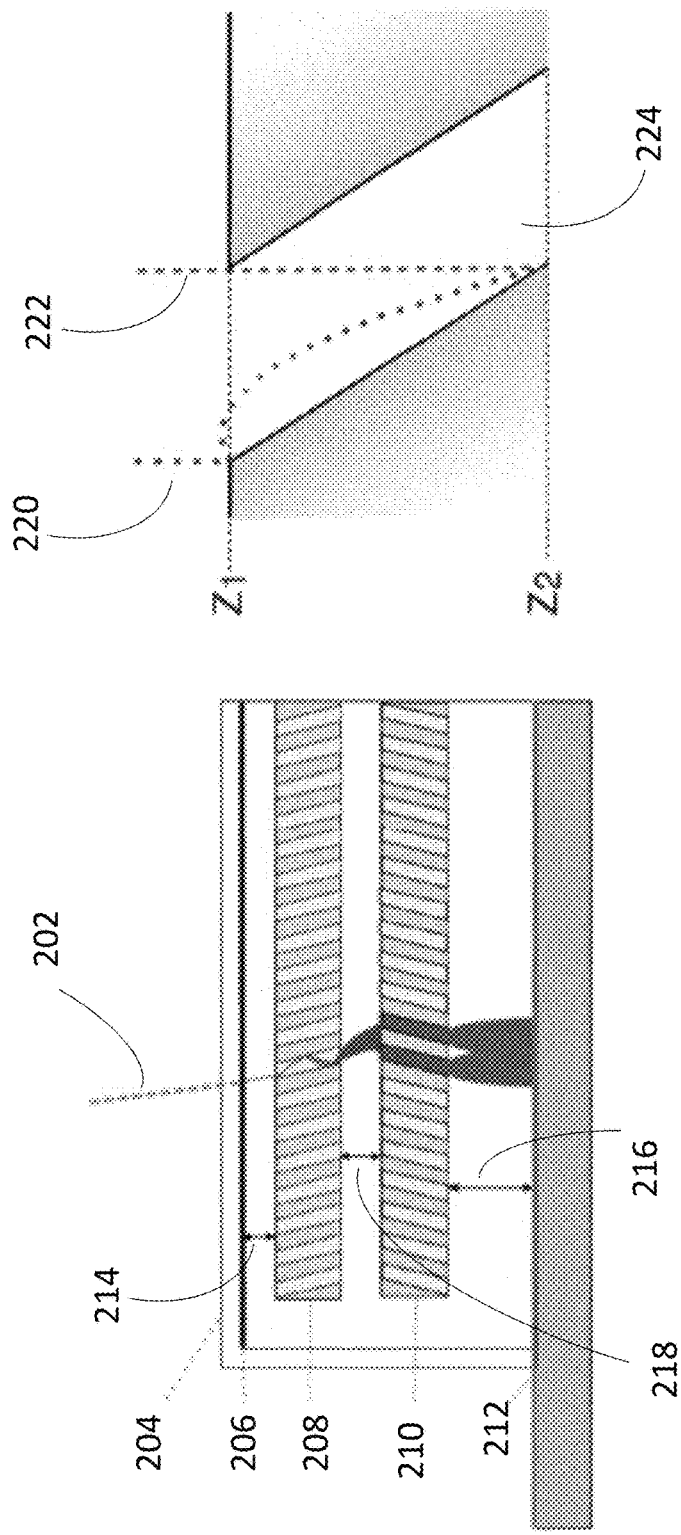
FIG. 2 illustrates the method by which the LAPPD of FIG. 1 detects photons.

Referring to FIGS. 1 and 2, a large area picosecond photo-detector (LAPPD) is a photon detector with a 2d spatial resolution of the order of millimeters and a temporal resolution of the order of 10 to 100 ps. The current design of the LAPPD has demonstrated a 2d spatial resolution of 0.5 mm. Alterations to the LAPPD design may produce a 2d spatial resolution of the order of sub-millimeters. The LAPPD exhibits improved spatial resolution and temporal resolution, as compared to other microchannel plate detectors, due to the fabrication method and materials used to manufacture the LAPPD (described in detail below). Due to the small feature size of the amplification stage, MCP-based photodetectors are intrinsically very fast, with rise times measured down to 60 ps. MCP's are also spatially homogeneous, so that the rise times are equally fast everywhere on the photodetector area. The temporal resolution is not equal to the rise time. The temporal resolution is typically much better than the rise time using constant-fraction discrimination, or other such techniques. The temporal resolution of the LAPPD is given by the transit-time jitter of the gain process.

As seen in FIG. 1, the LAPPD is comprised of a plurality of layers. The LAPPD includes at least two microchannel plates 112, 116 that are spaced apart, for example, by a glass spacer 114. In other embodiments, the spacer 114 may comprise a ceramic substrate coated with an electrically resistive layer. Each of the microchannel plates 112, 116 has a front surface, a rear surface, and a plurality of channels extending through the microchannel plates 112, 116 between the front surface and the rear surface of the microchannel plates 112, 116. The channels are substantially parallel to one another. The microchannel plates 112, 116 may be coated, for example, by Atomic Layer Deposition (ALD) with a coating to enhance properties such as conductivity and resistivity. For example, the coating may be comprised of alumina ($Al_2O_3$) with metal doping. ALD may be used to tailor the electrical resistance and secondary electron emission (SEE) properties of large area, low cost, borosilicate glass capillary arrays. The self-limiting growth mechanism in ALD allows atomic level control over the thickness and composition of resistive and secondary electron emission (SEE) layers that can be deposited conformally on high aspect ratio capillary glass arrays. Examples of ALD processes for the resistive coatings and see layers can be found in Mane, et al., "An atomic layer deposition method to fabricate," Physics Procedia, Volume 37, pages 722-732 (2012) ("Mane") and U.S. Pat. No. 8,969,823, the entire contents of which have been incorporated by reference in their entireties. As described in Mane, several robust and reliable ALD processes for the resistive coatings and SEE layers have been developed to give precise control over the resistance in the target range for MCPs ($10^6$-$10^9\Omega$) and SEE coefficient (up to 8).

In the embodiment of FIG. 1, each of the microchannel plates (MCP) 112, 116 has dimensions of 8"×8" (approximately 20 cm×20 cm). In a stacking direction (from top to bottom), the LAPPD includes a window and photocathode 104, an NiCr tab 106 for external HV, an indium top seal 108, a glass spacer 110, a top MCP 112, a glass spacer 114, a bottom MCP 116, a glass spacer 118, and bottom anode plate 122. The bottom anode plate 122 may include a sidewall 120, frit sealed to the anode plate 122, and a plurality of 50Ω strips that pass through the frit seal.

Figure 10:
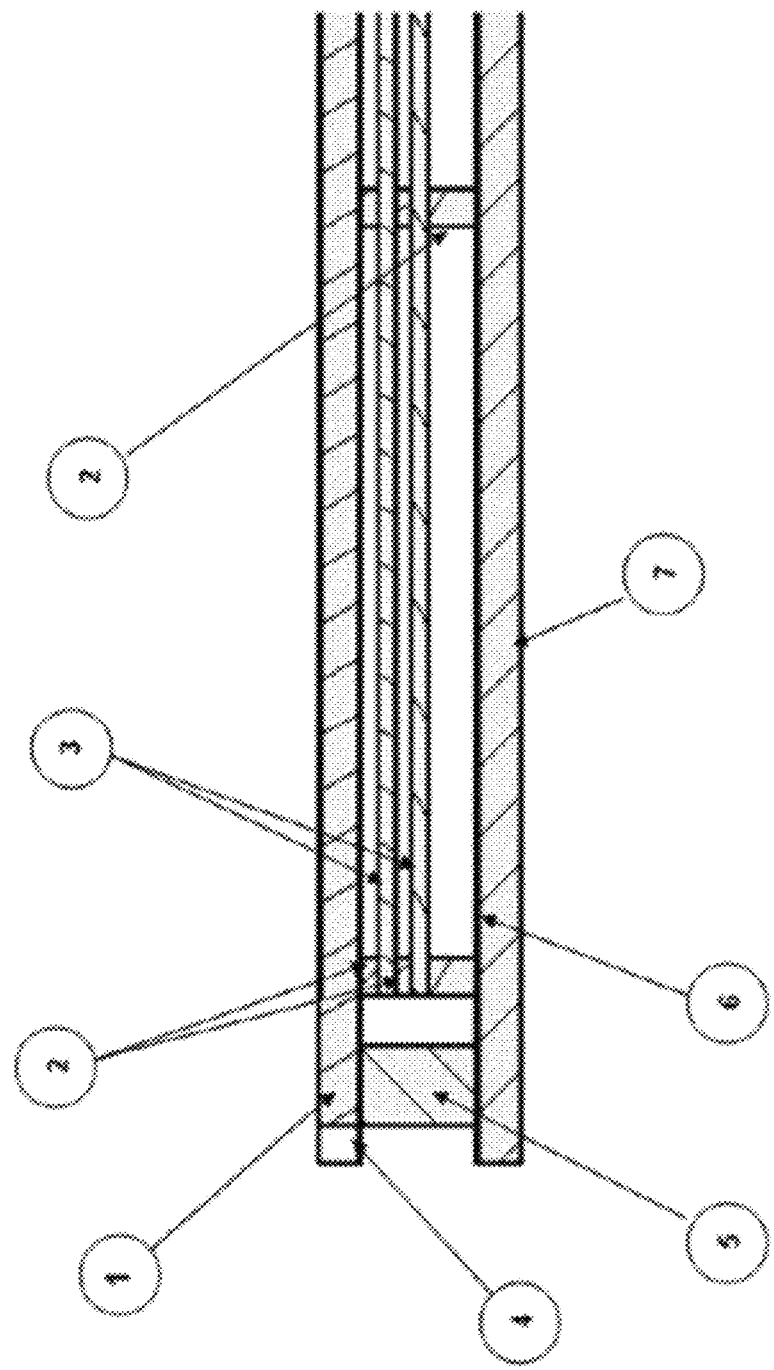
FIG. 10 illustrates a cross section of the LAPPD of FIG. 1.

A cross-section of the LAPPD is illustrated in FIG. 10. Some components of the LAPPD have been eliminated for clarity. A hermetic volume is formed by a top window 1, a side-wall 5, and a bottom plate 7. The photocathode is deposited on the inside of the window and makes contact with an external HV input through a metalized border 4. Grid spacers 2 and MCPs 3 may be coated with a resistive layer by ALD, with a target resistance, for example, of between 10 and 40 MΩ. The grid spacers 2 are configured to support the pressure on the top window 1 and the bottom plate 7. The bottom plate 7 may have silk-screened silver anode 50Ω microstrips fired on its surface 6 that penetrate a frit seal under the side-wall 5 and connect to digitizing electronics. The hermetic package may be made of borosilicate glass. The top window 1 may be sealed with indium to the base in vacuum after the photocathode is deposited. The three gird spacers 2 and the two MCPs 3 together with a DC grounded anode plane form the resistive HV divider that determines the voltage across the MCPs 3 and the three gaps formed by the grid spacers 2. Atmospheric pressure transmitted through the top window 1 and the bottom anode plane compresses the stack of grid spacers 2 and MCPs 3 into a rigid thin package. The MCPs 3 may be arranged in a chevron configuration. One example of the parameters of the layers that make of the LAPPD is given in Table 1 below.

As seen in FIG. 2, Light is incident on a photocathode, producing photoelectrons. The photoelectrons accelerate across a potential gap 214 toward a pair of microchannel plates 112, 116, which are high-gain structures comprised of thin plates with high secondary electron emission (SEE) enhanced, microscopic pores. Voltages of roughly 1 kV are applied across each plate. At typical voltages of ~1 kV, the gain is in the range of $10^4$-$10^5$. Pores are oriented, for example, at bias angles less than or equal to 18° in opposite directions such as bias angles of 8°. This prevents positive ions, produced by the electron cascade in the lower plate, from reaching and damaging the photocathode 104. It also provides a well-defined first strike for incoming electrons. The diameter of the pores may be, for example, 20 µm. The pores may have a length-to-diameter ratio of 60, making the thickness of each MCP 1.2 mm.

The schematic on the right side of FIG. 2 illustrates photoelectrons entering a pore of the MCP 224. Both the dashed line and dotted line trajectories 220, 222 reach height z1 at the same time, but arrive at height z2 at different times due to different velocities and path lengths.

Each electron entering a pore 224 accelerates and strikes the pore walls, starting an avalanche of secondary electrons. The avalanche builds until the amplified pulse exits the bottom of the second MCP 116. This electrical signal is collected on an anode structure 122 and passed through a vacuum assembly to sampling front-end electronics, which digitize the signal at 10-15 Gsamples/second. Spacing between the MCPs 112, 116 is set, for example, by glass grid spacers 114. Since the MCP 112, 116 channels operate independently, a spatial pattern of photons incident on the front surface will be preserved so that the back surface emits the same pattern but greatly amplified. In this way, the LAPPD can be used in imaging applications. Unlike lower-resolution photodetectors like photomultiplier tubes, the LAPPD can detect particles with temporal resolutions measured in picoseconds and produce fine-grained, high-resolution images with spatial resolutions below 10 micrometers.

Anode coverage over large areas is achieved using a 50 micro-stripline design. Details regarding the design and production of large-area RF strip-line anodes that may be used are found in Grabas, et al., "RF strip-line anodes for Psec large-area MCP-based photodetectors," Nuclear Instruments and Methods in Physics Research A, Vol. 711, pages 124-131 (2013), the entire contents of which has been incorporated by reference in its entirety. The positions of

TABLE 1

A tabulation of the layers in the tile assembly, starting with the top window and ending with the bottom anode layer. Mechanical stability against atmospheric pressure is provided by a glass grid spacer in each of the three gaps, as listed. All components except the microchannel plates are made from B33 borosilicate glass plate

| Layer | Thickness (mm) | Material | Resistive coatng | Metalization (side) |
|---|---|---|---|---|
| Window | 2.75 | B33 | Photocathode (bottom) | Nichrome border (bottom) |
| Grid spacer 1 | 2.0 | B33 | ALD-GS | None |
| MCP 1 | 1.2 | Micropore | ALD-MCP | Nichrome (both) |
| Grid spacer 2 | 2.0 | B33 | ALD-GS | None |
| MCP 2 | 1.2 | Micropore | ALD-MCP | Nichrome (both) |
| Grid spacer 3 | 6.5 | B33 | ALD-GS | None |
| Anode | 2.75 | B33 | N/A | Silver strips (top) |

In operation, a high voltage is applied across the top and bottom MCP 3 such that the rear surface of each MCP 3 is typically at 1000 V higher potential than the front surface.

photon strikes on the photocathode are determined (i) by differential timing along the striplines, and (ii) by calculating a weighted centroid of the charge on adjacent striplines in the transverse direction. This embodiment allows economical area coverage as the number of readout channels scales linearly with length, rather than quadratically.

The timing characteristics of these photodetectors are determined by two key aspects of the detection process:

(1) Jitter in the formation of avalanches within the gain stage: This is determined by the physical properties of the MCP stack, such as pore diameters and bias angles, operational voltages, spacing between the components, and SEE characteristics; and (2) Information loss in the transmission and recording of the signal: This includes noise, attenuation of high frequency components as the pulse travels along the striplines, and quantization effects from pulse digitization.

These aspects are described in further detail in Adams, et al., "Timing Characteristics of Large Area Picosecond Photodetectors," Nuclear Instruments and Methods in Physics Research Section A: Accelerators, Spectrometers, Detectors and Associated Equipment, Vol. 795, pages 1-11 (2015) (hereinafter "Adams"), the entire contents of which has been incorporated by reference in its entirety.

The LAPPD is a photon detector with a 2d spatial resolution of the order of millimeters or sub-millimeters and a temporal resolution of the order of 10 to 100 ps. For example, an LAPPD with the dimensions 20 cm×20 cm has a spatial resolution of approximately 1 mm×approximately 1 mm. In other embodiments, the LAPPD may have a spatial resolution on the order of microns, for example 50 microns× 50 microns or 500 microns×500 microns. The temporal resolution of the LAPPD is of the order of 50 to 100 ps, for example, 70 ps, or below 70 ps (e.g., 50 ps or 60 ps). In the study conducted by Adams, the RMS measured at one particular point on the LAPPD detector is 58 ps with ±1σ of 47 ps. The differential temporal resolution between the signal reaching the two ends of the delay line anode was measured to be 5.1 ps for large signals, with an asymptotic limit falling below 2 picoseconds as noise-over signal approaches zero. This is much faster than any other imaging detector and offers an opportunity to perform ghost imaging with real thermal light, using narrowband interference filters to achieve the μeV to meV bandwidth reciprocal to 100 ps to 1 ps.

In other embodiments, ghost imaging may be performed with x-rays, using a high-resolution monochromator of the type developed for nuclear-resonance scattering in conjunction with an LAPPD-style x-ray detector. This would require a very bright x-ray source such as an x-ray free-electron laser.

By altering the fabrication process, the LAPPD can potentially be pushed towards temporal resolutions of a few ps. Furthermore, interference filters can be customized for a narrower bandpass. Either way, or both in combination, will then yield a ghost-imaging system with near-perfect visibility at a time-bandwidth product of about 1.

As discussed above, ghost imaging can be used to "see" under adverse conditions, but requires a detector with high temporal resolution or a very narrow spectrum. The LAPPD has sufficient temporal resolution to perform thermal ghost imaging with true thermal light (i.e., no HCL or pseudo-thermal source). Therefore, the LAPPD may be used in methods of thermal-light ghost imaging, i.e., the use of photon correlations to obtain an image under adverse conditions, such as turbulent air in the optical paths.

Other Applications

The LAPPD may also be used in other applications where the LAPPD technology can leverage its combination of imaging and high temporal resolution.

Figure 7:
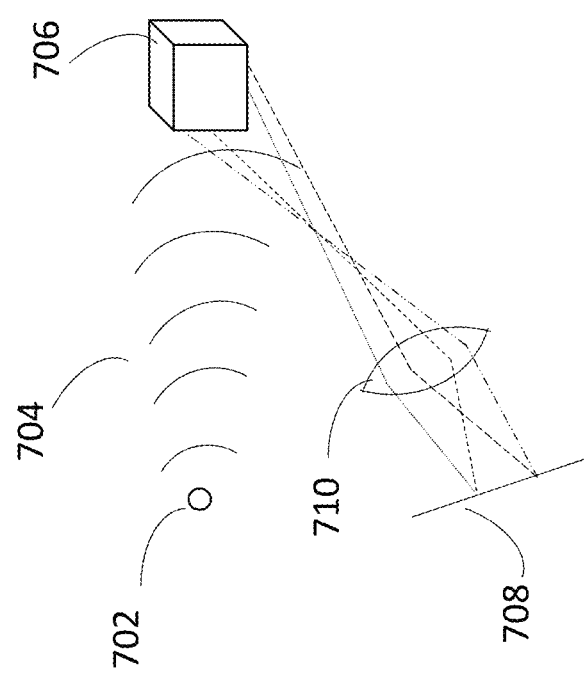
FIG. 7 is a schematic representation of 3d imaging using the natural intensity fluctuations of a thermal light source (light bulb, star, etc.). Relative distances of different parts of the object are encoded in corresponding time offsets of the stochastically fluctuating illumination.

One such application is the use of the LAPPD in "thermal LIDAR" (light detection and ranging). Generally an LAPPD can use its temporal resolution to obtain distance information for each pixel in an image to provide, essentially, 3d imaging. Furthermore, the temporal resolution can be used to extract useful information out of randomness. In the thermal-LIDAR application, it is the randomly fluctuating intensity of a natural thermal-light source that is used to obtain the distance information. This is shown schematically in FIG. 7, where light originating from a thermally fluctuating light source 702 is scattered from different parts of an object 706, which are imaged onto different pixels. Each pixel will then receive light with the intensity fluctuations of the source, offset in time relative to neighboring pixels by an amount corresponding to their relative optical paths. By comparing time sequences of intensities from all pixels using digital signal-correlation techniques, the relative distances to different parts of the object can be found. The image will then contain information about the third dimension in addition to the two dimensions of a conventional image.

Because the source 702 is natural, the technique can be used in an inconspicuous way, and without the need for a special and expensive light source. Unlike true LIDAR, this technique does not give absolute, but only relative range information. Absolute distance information can, however, be obtained if the light from the source is monitored by another ps detector, as long as that is done within the transverse coherence length, which may be kilometers in the case of the light from a distant star ("point" source). With the current 50-ps temporal resolution of LAPPD 708, the range resolution is of the order of 15 mm. It is likely that this number will improve with further developments of the LAPPD 708. The lateral distances over which the relative range information can be found are proportional to the transverse coherence of the illumination light. The relatively large angular diameter of the sun (about 0.5 degrees) corresponds to a transverse coherence length of about 100 microns, which is probably not enough for most practical applications. This is much different, however, with starlight. Even if there are multiple stars illuminating a scene, each will produce its own distinct temporal pattern of intensities, and digital correlation techniques can separate them. Because LAPPD 708 is a photon-detection technique, starlight illumination is quite sufficient for generating an image. The capability of LAPPD 708 to generate a continuous data stream of time/location data is crucial to be able to monitor an extended time sequence of the fluctuating light.

Another LIDAR application of LAPPD 708 includes using the LAPPD to see through fog. Unlike the thermal LIDAR, this application requires an artificial light source with deterministic intensity variation, such as pulses. With this, the random scatter of light in a fog can be suppressed from an image. The main problem in such cases is that the light coming directly from the object to be imaged is overlaid heavily by scattered light. In a conventional image, this scattered light cannot be discriminated against direct light from the object. However, if an LAPPD 708 is used, any light detected outside a 50-ps window can be disregarded, which, at the speed of light, corresponds to an optical path difference of ±7.5 mm relative to the direct path.

Figure 8:
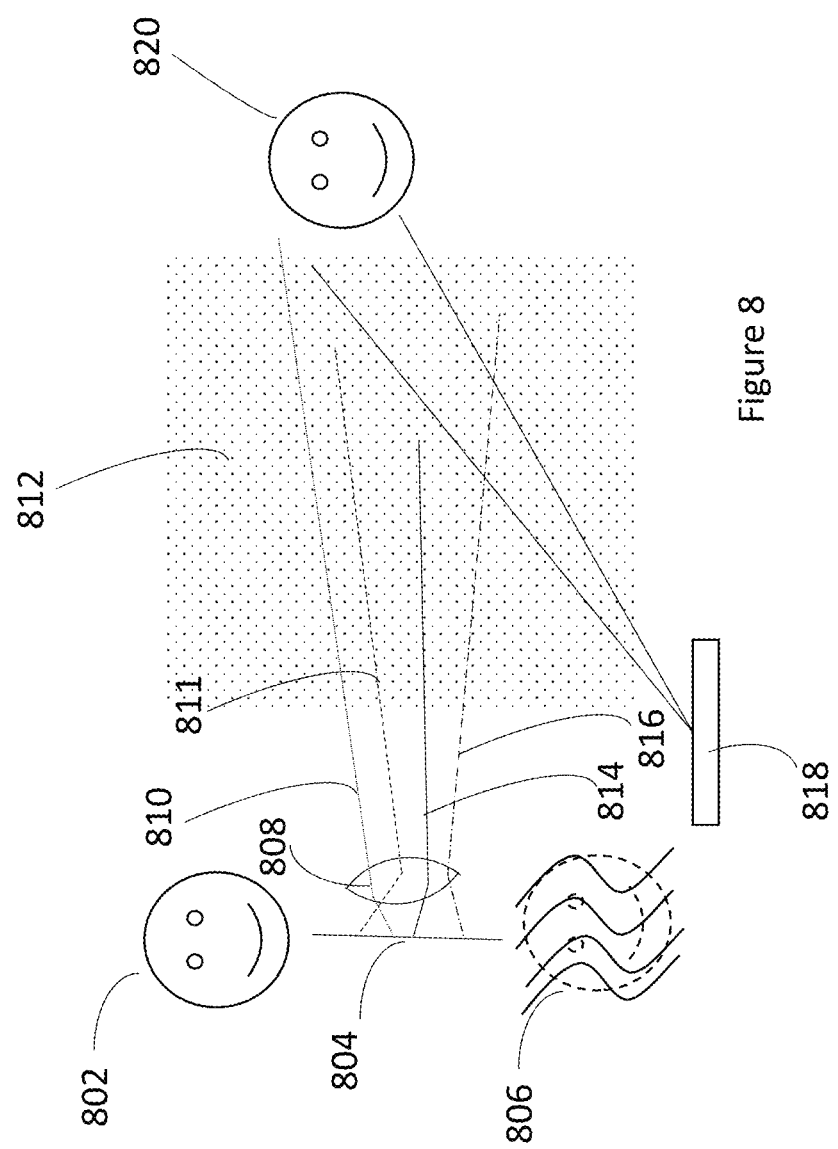
FIG. 8 is a schematic representation of imaging through a strongly scattering medium, such as fog. The light coming directly from the object is overlaid by both light coming from other parts of the object that is scattered in the fog, and by illumination light back-scattered from the fog. These traces have different optical paths, and therefore different signal-arrival times on the detector.

FIG. 8 shows a schematic representation of two effects to contend with: first, light from the illumination source 818 scattered in the fog 812 overlays the image 806 like a veil (wavy lines in the time-integrated image in the figure). It arrives well before the light from the object, and can thus be easily suppressed through time-resolved imaging. Second, scattering of light on the way from the object to the detector leads to a blurring of the image. That light also travels a longer path than the direct light but the difference is less distinct than for the back-scattered illuminating light.

Figure 9:
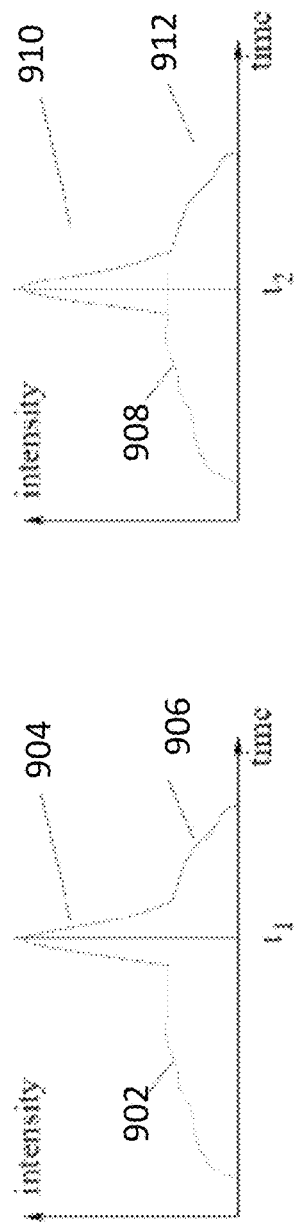
FIG. 9 is a schematic time series of photon arrivals at two pixels (left-hand and right-hand graph) on the detector corresponding to different points on the object. For each pixel, the object is identified by the strong scattering peak in the time series, and everything else is suppressed in data processing.

The proposed imaging setup comprises a light source emitting a train of pulses, each lasting less than the LAPPD temporal resolution (50 ps). For each pixel on the detector, the arrival times of photons are recorded in a time series, which will show distinct features relating to the object itself, and more diffuse ones related to scattering from the fog. Since the distance from the light source to the object, and back to the detector, is generally not known, one cannot set an a-priori time gate. When using a gated detector, one therefore needs to scan the gate timing. What sets the LAPPD apart from many other time-resolving imaging detectors is that it achieves the high temporal resolution without the need for gating. This is attributed to the MCPs, which generate the fast pulses whenever a photon is absorbed, and the fast waveform sampling electronics that sample continuously and digitize on-demand (i.e., whenever an event actually occurs). Rather, it can generate a continuous data stream of time- and location-tagged events. The range information of LIDAR is then found by identifying the strong light echo, whenever it occurs relative to the illuminating pulses, and everything else can be suppressed. Such time series are shown, schematically, in FIG. 9. FIG. 9 illustrates a graph of intensity on the vertical axis and time on the horizontal axis. At t1 the intensity of the scattered illuminating light 902 is first followed by the direct light from the object 904 and the scattered object light 906. Likewise at t2, the intensity of the scattered illuminating light 908 is first followed by the direct light from the object 910 and the scattered object light 912. In other words, the information on different light-travel times is generated all at once and can be extracted using electronic post-processing. The suppressed-scatter image can thus be obtained much faster than with a gated detector, which is of great practical value, and reduces the probability of being detected in security applications.

The embodiments described above have a number of industrial and security applications. For example, thermal ghost imaging with the LAPPD may be used to image under adverse conditions, such as looking into a furnace, through a fog, or other settings in which visibility is a concern. Thermal ghost imaging with the LAPPD may also be used to view an object or person inconspicuously (i.e., without the viewer being detected).

The construction and arrangements of the LAPPD and methods for true thermal-light ghost imaging with the LAPPD, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "front," "rear," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

What is claimed:

1. A system for type-2 ghost imaging of an object located in a turbulent air section or obstructed by a turbulent air section, the system comprising:
   a true thermal light source emitting light, the light travelling in a first optical path;
   a beamsplitter optically connected to the true thermal light source, the beamsplitter configured to split the first optical path into a second and third optical path of substantially equal lengths;
   a surface optically connected to either the second or third optical path, the object optically connected to the remaining optical path;
   a narrowband spectral filter; and
   at least one detector optically connected to both the second and third optical path, the at least one detector having a predetermined spatial resolution and a predetermined temporal resolution,
   wherein the object is located on one side of the turbulent air section and the at least one detector is located on another side of the turbulent air section.

2. The system of claim 1, wherein the predetermined spatial resolution is of the order of millimeters and the predetermined temporal resolution is of the order of picoseconds.

3. The system of claim 1, wherein the true thermal light source is point-like.

4. The system of claim 1, wherein the true thermal light source is not a laser.

5. The system of claim 1, wherein the true thermal light source comprises light from a sun, light from a light bulb, or light from a star.

6. The system of claim 1, wherein the at least one detector comprises a microchannel plate-based detector.

7. The system of claim 1, wherein the at least one detector comprises a non-microchannel-based detector.

8. The system of claim 1, wherein the predetermined spatial resolution is at least 16×16 pixels.

9. The system of claim 1, wherein the predetermined spatial resolution is at least 32×32 pixels.

10. The system of claim 1, wherein the predetermined spatial resolution is at least 100×100 pixels.

11. The system of claim 1, wherein the predetermined spatial resolution is at least 400×400 pixels.

12. The system of claim 1, wherein the predetermined temporal resolution is in the picosecond range.

13. The system of claim 1, wherein the at least one detector comprises a large area picosecond photo-detector (LAPPD) having a spatial resolution of the order of millimeters and a temporal resolution of the order of 10 to 100 picoseconds.

14. The system of claim 1, wherein a first half of the at least one detector is configured to function as a bucket detector that collects and counts photons scattered and reflected from the object in the first region, and a second half of the same detector is configured to function as an imaging detector that captures reference spatial information of reflected light from the second region.

15. The system of claim 1, wherein the system includes exactly two detectors, a first detector configured to function as a bucket detector that collects and counts photons scattered and reflected from the object in the first region, the first detector optically connected to either the second or third optical path, and a second detector configured to function as an imaging detector that captures reference spatial information of reflected light from the second region, the second detector optically connected to the remaining optical path.

16. The system of claim 15, wherein both the first detector and the second detector are a large area picosecond photo-detector (LAPPD) having a spatial resolution of the order of millimeters and a temporal resolution of the order of 10 to 100 picoseconds.

17. The system of claim 15, wherein both the first detector and the second detector are a large area picosecond photo-detector (LAPPD) having a spatial resolution of the order of millimeters and a temporal resolution of the order of 10 to 100 picoseconds.

* * * * *